US012746468B2

(12) United States Patent
Kavallierou et al.

(10) Patent No.: US 12,746,468 B2
(45) Date of Patent: Sep. 29, 2026

(54) METHODS OF EXTERNALLY-RENDERING AN AVATAR

(71) Applicant: Sony Interactive Entertainment Europe Limited, London (GB)

(72) Inventors: Michael Adam Kavallierou, London (GB); Aron Giuseppe Visciglia, London (GB); Lloyd Preston Stemple, London (GB); Pedro Federico Quijada Leyton, London (GB); David Erwan Damien Uberti, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 266 days.

(21) Appl. No.: 18/288,663

(22) PCT Filed: Apr. 20, 2022

(86) PCT No.: PCT/GB2022/050993
§ 371 (c)(1),
(2) Date: Oct. 27, 2023

(87) PCT Pub. No.: WO2022/229603
PCT Pub. Date: Nov. 3, 2022

(65) Prior Publication Data

US 2024/0261679 A1 Aug. 8, 2024

(30) Foreign Application Priority Data

Apr. 28, 2021 (GB) ...................................... 2106042

(51) Int. Cl.
*A63F 13/52* (2014.01)
*G06T 13/40* (2011.01)
*G06T 19/00* (2011.01)

(52) U.S. Cl.
CPC .............. *A63F 13/52* (2014.09); *G06T 13/40* (2013.01); *G06T 19/00* (2013.01)

(58) Field of Classification Search
CPC ....... G06T 13/205; G06T 13/40; G06T 19/00; G06T 19/20; G06T 15/205; G06T 17/20;
(Continued)

(56) References Cited

U.S. PATENT DOCUMENTS 5,774,668 A 6/1998 Choquier et al.
6,173,322 B1 1/2001 Hu
(Continued)

FOREIGN PATENT DOCUMENTS

EP 3541068 A1 9/2019
WO 2007/130691 A2 11/2007
WO 2013/091157 A1 6/2013

OTHER PUBLICATIONS

International Search Report and Written Opinion received in corresponding Application No. PCT/GB2022/050993, mailed Aug. 26, 2022, in 15 pages.
(Continued)

*Primary Examiner* — Lawrence S Galka
(74) *Attorney, Agent, or Firm* — Kilpatrick Townsend & Stockton LLP

(57) ABSTRACT

Disclosed herein is a method and system for generating an adjustment in a visual aspect of a computer-implemented interactive environment. The method and system conserve
(Continued)

the resources of the computing resource implementing the environment and still enable visual representations of users, such as avatars, to be generated.

21 Claims, 12 Drawing Sheets

(58) Field of Classification Search
CPC ............. G06T 2210/16; G06T 2215/16; G06T 2219/2016; G06T 2219/2021; A63F 13/211; A63F 13/212; A63F 13/355; A63F 13/424; A63F 13/63; A63F 13/65; A63F 13/67; A63F 2300/1081; A63F 2300/1087; A63F 2300/6045; A63F 2300/6056; A63F 2300/69; G06F 3/011; G06F 3/012; G06F 3/017; G06F 3/04815; H04N 21/23418; H04N 21/4394; H04N 21/44008; H04N 21/44218; H04N 21/4532; H04N 21/4781; H04N 21/8847; H04N 13/279; H04N 13/344; H04N 13/383
See application file for complete search history.

(56) References Cited

U.S. PATENT DOCUMENTS

| | | | | |
|---|---|---|---|---|
| 2007/0180113 | A1 | 8/2007 | Van Bemmel | |
| 2007/0260984 | A1* | 11/2007 | Marks | A63F 13/65 715/706 |
| 2013/0257876 | A1 | 10/2013 | Davis | |
| 2015/0130813 | A1 | 5/2015 | Taraki et al. | |
| 2015/0207750 | A1 | 7/2015 | Birkestrand et al. | |
| 2016/0361653 | A1 | 12/2016 | Zhang et al. | |
| 2017/0193684 | A1 | 7/2017 | Du et al. | |
| 2019/0035149 | A1 | 1/2019 | Chen et al. | |
| 2019/0266775 | A1 | 8/2019 | Lee et al. | |
| 2019/0287313 | A1* | 9/2019 | Kavallierou | H04N 21/466 |
| 2020/0306640 | A1* | 10/2020 | Kolen | G06N 3/094 |
| 2021/0005003 | A1 | 1/2021 | Chong et al. | |

OTHER PUBLICATIONS

UK IPO Combined Search and Examination Report received in Application No. GB2106042.1, date of search Oct. 26, 2021, in 9 pages.
UK IPO Examination Report received in Application No. GB2106042.1, dated Feb. 26, 20241, in 4 pages.

* cited by examiner

METHODS OF EXTERNALLY-RENDERING AN AVATAR

CROSS-REFERENCE TO RELATED APPLICATIONS

This application is a US national stage application of International Application PCT/GB2022/050993, filed Apr. 20, 2022, which claims the benefit of Application No. GB 2106042.1, filed on Apr. 28, 2021, the contents of which are incorporated herein by reference.

TECHNICAL FIELD

The invention relates to a method and system. Particularly, but not exclusively, the invention relates to a computer-implemented method and system. Further particularly, but not exclusively, the invention relates to a computer-implemented method for generating a visual adjustment in a computer-implemented interactive entertainment environment.

BACKGROUND

Gaming is as popular as it has ever been. The advances in processing resources, motion recognition and graphics technology means that gaming is providing more interactive entertainment than it ever has before.

One of the aspects of gaming environments which is witnessing particular growth is that of the use of personalisation of the gaming environment and interaction with other players, who could be in the same room or on the other side of the world.

One popular form of personalisation is the avatar, but personalisation in the form of avatars is often limited to specific designs provided by software inside devices. This limits the options for personalisation.

Aspects and embodiments were conceived with the foregoing in mind.

SUMMARY

Aspects relate to the generation of visual adjustments in computer-implemented interactive entertainment environments. A computer-implemented interactive entertainment environment may be a gaming environment or any other virtual environment provided for interaction with operatives of a computing device. Such visual adjustments could be changes in some visual aspect of a gaming environment, such as a change in an avatar, a message composited into the gaming environment or a notification from the gaming environment or related to an event from the gaming environment.

Viewed from a first aspect, there is provided a computer-implemented method for generating a visual adjustment in a computer-implemented interactive entertainment environment. An example of a computer-implemented interactive entertainment environment could be an augmented reality environment, a virtual reality environment or a gaming environment provided by a games console or processing resource. The method may be implemented by a first computing resource. The first computing resource may be a gaming console, an extended reality headset, a cloud-based computing resource or a plurality of distinct computing resources each with their own processing capability. The cloud-based computing resource may comprise a plurality of cloud instances or virtual machines. The first computing resource may form part of a peer-to-peer communications network with other computing resources. The method may comprise initializing the computer-implemented entertainment environment, wherein the computer-implemented entertainment environment comprises a plurality of computer-generated visual elements. The computer-generated visual elements may comprise at least one of or a plurality of an avatar, a collection of avatars corresponding to multiple participants in a gaming environment, a gaming asset such as an icon, a character, a non-playing character, a notification or a message. The method may further comprise, responsive to a request for the addition into or alteration of at least one computer-generated visual element in the computer-implemented entertainment environment, wherein the request is generated responsive to multimedia input received from at least one of a plurality of input sources, obtaining data corresponding to the requested addition or alteration of the at least one visual element from a second computing resource. The second computing resource may be configured to utilize processing capacity at the second computing resource or accessible by the second computing resource to process the request for the addition into or alteration of at least one computer-generated visual element in the computer-implemented entertainment environment. The request for the addition into or alteration of at least one computer-generated visual element in the computer-implemented entertainment environment may be received via a user input into user-interface at a computing resource which is different from the first or second computing resource and then transmitted to the second computing resource using any suitable telecommunications network. Amendment or addition of at least one visual element may comprise an animation of the at least one visual element. Amendment or addition of at least one visual element may be context driven by device input. Multimedia input may be provided by a camera, a microphone or any other sensor configured to receive input from outside of the computer-implemented interactive environment. Based on the obtained data corresponding to the requested addition or alteration of the at least one visual element from the second computing resource, the method may further comprise processing the requested addition or alteration of the at least one visual element to enable the added or altered at least one visual element to be composited into the computer-implemented interactive environment.

The processing of the requested addition or alteration may comprise accessing applications using corresponding application programming interfaces and/or software development kits. The processing of the requested addition or alteration may comprise accessing applications on the respective computing device.

Viewed from a second aspect, there is provided a computer-implemented method for generating a visual adjustment in a computer-implemented interactive entertainment environment comprising a plurality of computer-generated visual elements, the method implemented by a second computing resource. The second computing resource may be a gaming console, an extended reality headset, a cloud-based computing resource or a plurality of distinct computing resources each with their own processing capability. The cloud-based computing resource may comprise a plurality of cloud instances or virtual machines. The second computing resource may form part of a peer-to-peer communications network with other computing resources. Responsive to a request associated with addition into or alteration of at least one computer-generated visual element in the computer-implemented entertainment environment, the method comprises the step of generating data corresponding to the requested addition or alteration of the at least one visual element on the second computing resource by processing multimedia input received from at least one of a plurality of input sources. The second computing resource may be configured to utilize processing capacity at the second computing resource or accessible by the second computing resource to process the request for the addition into or alteration of at least one computer-generated visual element in the computer-implemented entertainment environment. The request for the addition into or alteration of at least one computer-generated visual element in the computer-implemented entertainment environment may be received via user input into a user interface at a computing resource which is different from the first or second computing resource and then transmitted to the second computing resource using any suitable telecommunications network. The data corresponding to the requested addition or alteration may be processed and saved as a suitable file format prior to transmission to a device where the added or altered at least one visual element is composited into the computer-implemented interaction environment. Amendment or addition of at least one visual element may comprise an animation of the at least one visual element. Amendment or addition of at least one visual element may be context driven by device input. Multimedia input may be provided by a camera, a microphone or any other sensor configured to receive input from outside of the computer-implemented interactive environment. Transmitting the generated data to the first computing resource. The transmission may be implemented using any suitable network configuration such as, for example, the world-wide web or a peer-to-peer network.

Methods in accordance with the first or second aspects enable an amendment or addition of a visual element to be processed on a device which does not provide the computer-implemented interactive environment. This means the processing capacity of the device providing the interactive environment can be reserved for providing the interactive environment and processing resources do not have to be committed to the amendment or addition of visual elements. The request for amendment or addition of at least one visual element, the generation of the data corresponding to the requested amendment or addition of the at least one visual element, the processing of the requested addition or alteration of the at least one visual element and the rendering of the requested addition or alteration into the computer-implemented interactive entertainment environment may be performed in real-time, i.e. as the request for amendment or addition is generated at the input source.

Optionally, the first computing resource may be operative to provide a first processing capacity, and, further optionally, the second computing resource may be operative to provide a second processing capacity. For example, the second computing resource may be distinct from the first computing resource. The second computing resource and the first computing resource may be linked by any suitable telecommunications network. For example, they may be part of the same peer-to-peer configuration.

Optionally, the request may be received from at least one user computing device of a plurality of user computing devices, wherein a given user computing device among the plurality of user computing devices may correspond to a given user specific to the given user computing device in the computer-implemented entertainment environment. The request may be transmitted from the given user computing device via any suitable network configuration. The request may identify the user of the at least one user computing device. The request may comprise visual and/or audio components. The request may be received at computing device which is selected from among a plurality of computing devices based on processing capacity or current bandwidth.

The effect of this is that a user computing device in a plurality of user computing devices corresponding to a corresponding plurality of profiles in the computer-implemented entertainment environment may transmit the request for an amendment or alteration of a visual element to a designated device which incurs the processing overhead.

Optionally, wherein the request may be associated with the addition or alteration of a graphical representation of the given user into the computer-implemented interactive entertainment environment.

This means that processing overhead associated with changes to graphical representations of the user is concentrated on a device which is not also responsible for generating the computer-implemented entertainment environment.

Optionally, wherein the alteration of the graphical representation of the given user may comprise a change in a visual characteristic of the graphical representation of the given user. Such a visual characteristic may be a facial expression, a colour or an animated gesture such as a celebration or other form of gesticulation.

Optionally, the request may be based on an image associated with the given user and/or the given user computing device. That is to say, the addition or amendment may be based on an image captured by a computing device and used to generate a graphical representation of the user.

Optionally, the at least one user computing device may be the second computing resource.

Optionally, the method may further comprise converting the image into an avatar representation of the user corresponding to the given user; and, further optionally, the method may further comprise assigning the avatar as a graphical representation of the given user to be used in the computer-implemented interactive entertainment environment.

The avatar representation may be stored on the device where it is generated, on a device associated with the corresponding user, or in a cloud resource.

The effect of this is the processing associated with avatar generation is sent to a device which is not the device which generates the interactive environment. The processing overhead is therefore not absorbed by generation of the avatar.

Optionally, the method may further comprise: retrieving an avatar representation of the given user from an image store; and further optionally, the method may further comprise assigning the retrieved avatar representation as a graphical representation of the given user to be used in the computer-implemented interactive entertainment environment.

Avatar representations may be dependent on a specific computer-implemented interactive entertainment environment. Changes to avatar representations may be context driven (e.g. by other game inputs such as pausing the game) or may be determined by a specific title of a computer game provided by the computer-implemented interactive entertainment environment.

The image store may be on either of the first or second computing resources or stored elsewhere. The image store may be located in the cloud.

Optionally, wherein the request may be associated with the first computing device responsive to an event associated with the computer-implemented interactive entertainment environment, wherein the request comprises metadata corresponding to the event.

The effect of this is that amendments or additions of visual effects may be responsive to events inside the computer-implemented interactive entertainment environment. Such "in game" events may cause amendments or additions to be generated. These events may be celebratory or reflective of some significant goal or progress associated with the corresponding user profile.

Optionally, based on the metadata, the method may further comprise generating an addition or alteration of a visual element associated with the computer-implemented interactive entertainment environment. The metadata may identify specific events and users associated with those events.

Optionally, wherein the addition or alteration of the visual element may correspond to a change in the given user's status associated with the computer-implemented interactive entertainment environment.

The effect of this is that in-game events, such as player progress, are processed by another device where the processing of the addition or amendment of visual effects is concentrated. This means the processing is not concentrated on the device which is providing the computer-implemented interactive entertainment environment.

Optionally, wherein the request may comprise an audio-component. The audio component may be provided by a microphone on one of the computing devices.

The effect of this is that audio components and visual components can both be composited into the computer-implemented interactive entertainment environment whilst reducing the processing overhead on the device which provides the computer-implemented interactive entertainment environment.

Optionally, the method may further comprise the step of formatting the audio component for compositing into the computer-implemented interactive entertainment environment synchronously with the requested alteration or addition of the visual element. Formatting the audio component may comprise generating an audio file which is composited into the computer-implemented entertainment environment.

Optionally, the second computing resource may be a cloud resource or a mobile computing device.

Optionally, wherein the plurality of input sources may comprise at least one camera.

Optionally, wherein the plurality of input sources may comprise at least one microphone.

Optionally, the at least one of the plurality of input sources may provide data relating to the use of the respective first or second computing device. The effect of this is that usage patterns of the respective devices may result in requests for amendments or additions of visual effects into the computer-implemented entertainment environment.

DESCRIPTION

Aspects and embodiments of the present disclosure will now be described, by way of example only, and with reference to the accompany drawings, in which.

Figure 3A:
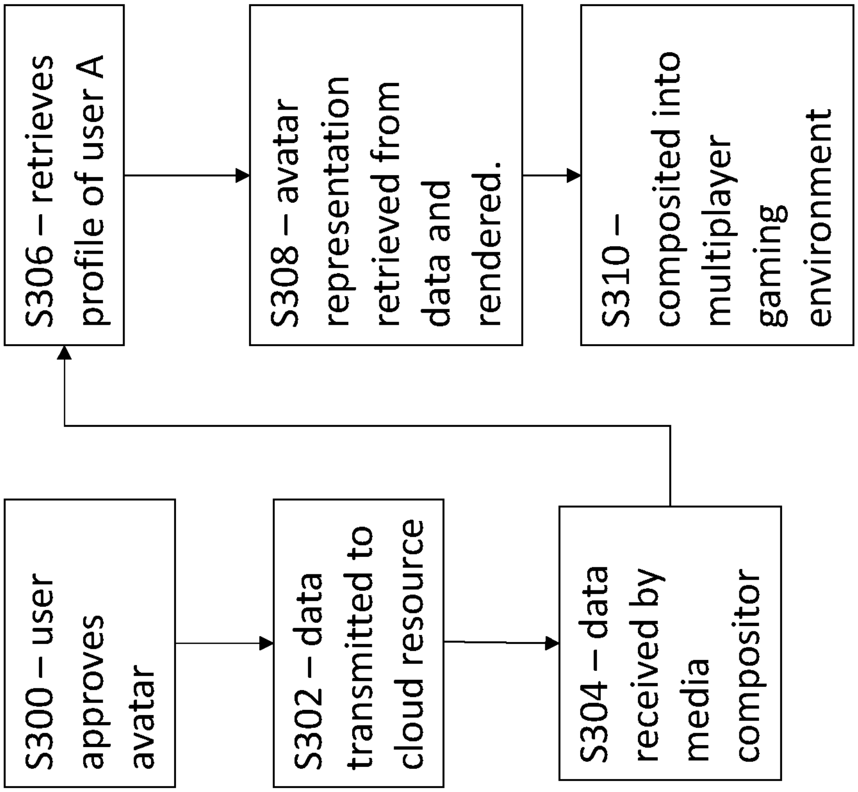
Figure 3B:
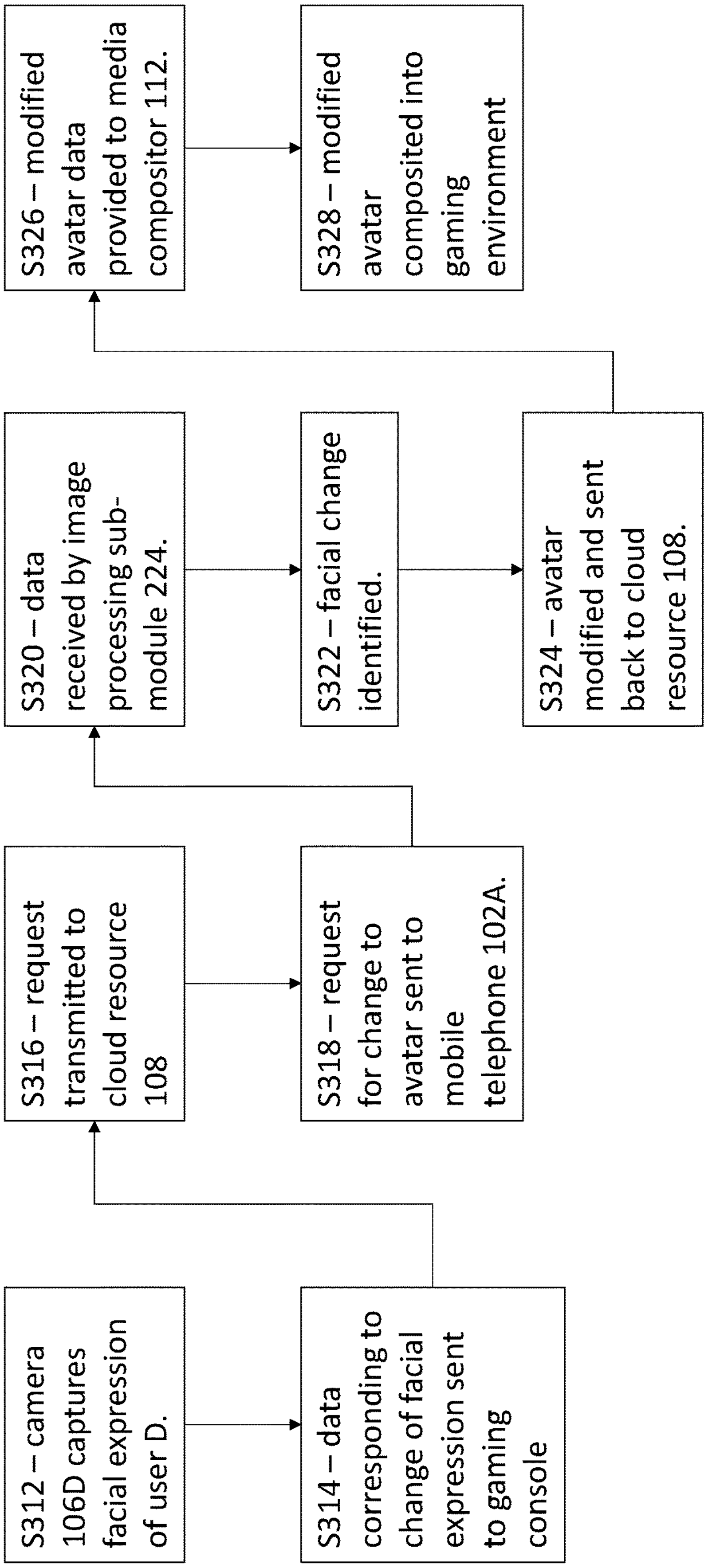
Figure 3C:
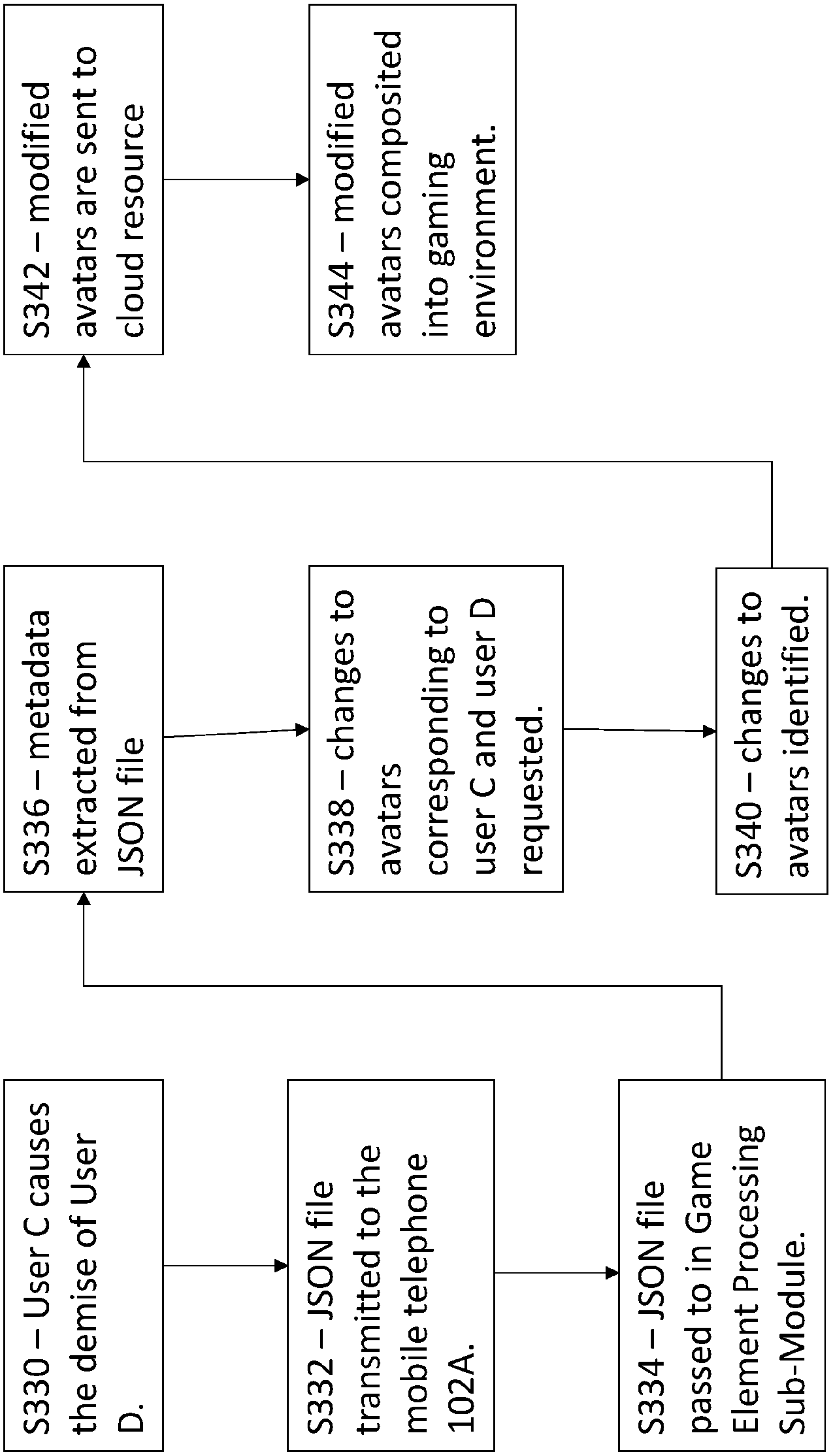
Figure 4:
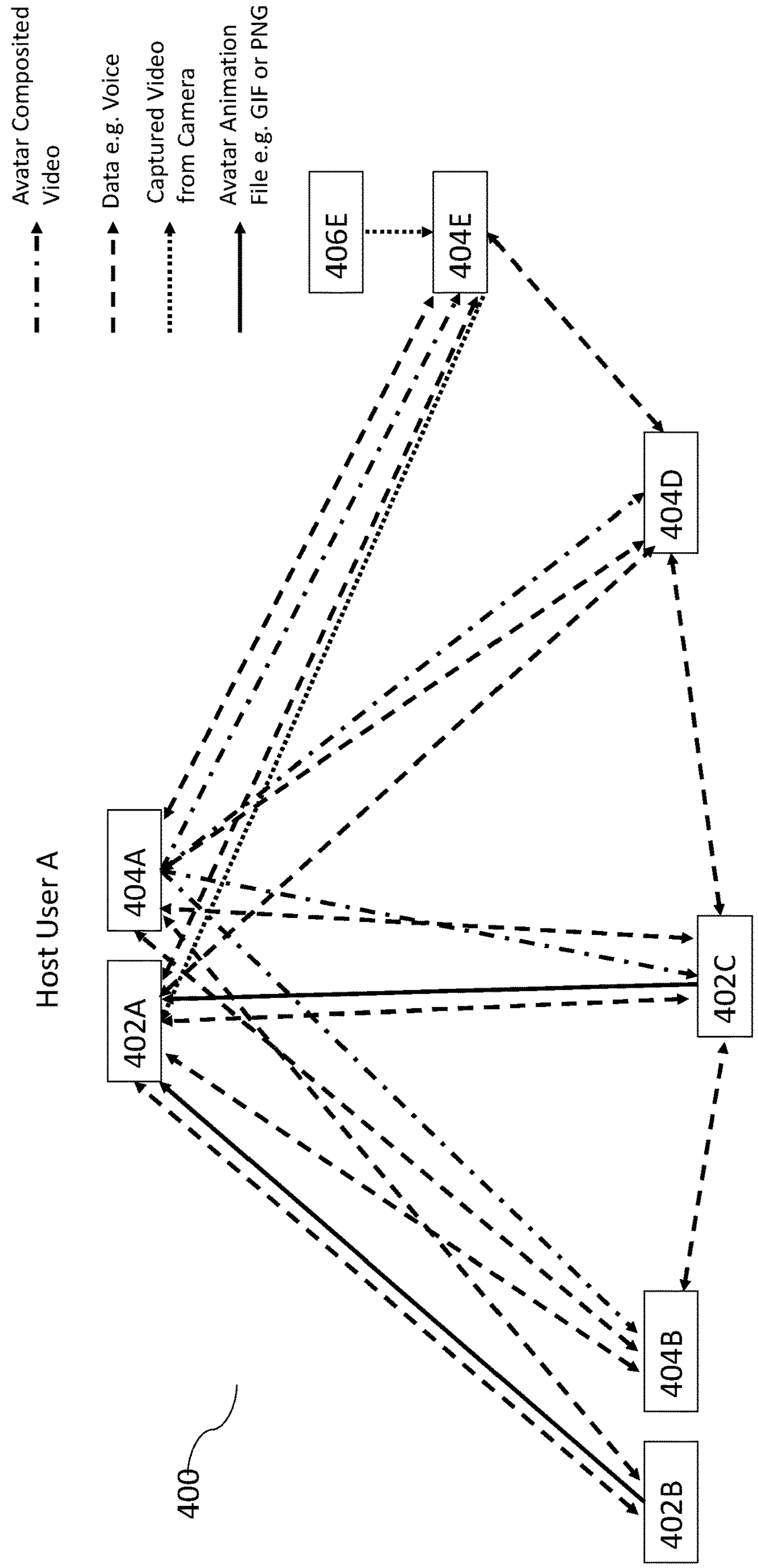
Figure 5:
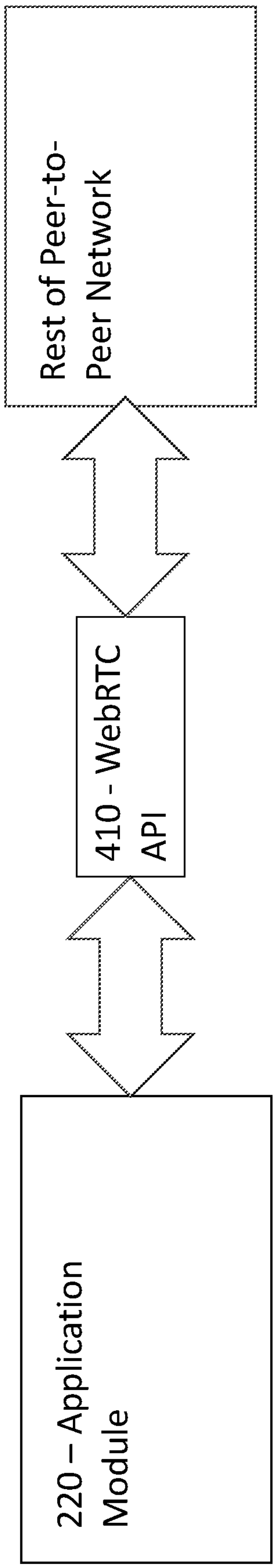
Figure 6:
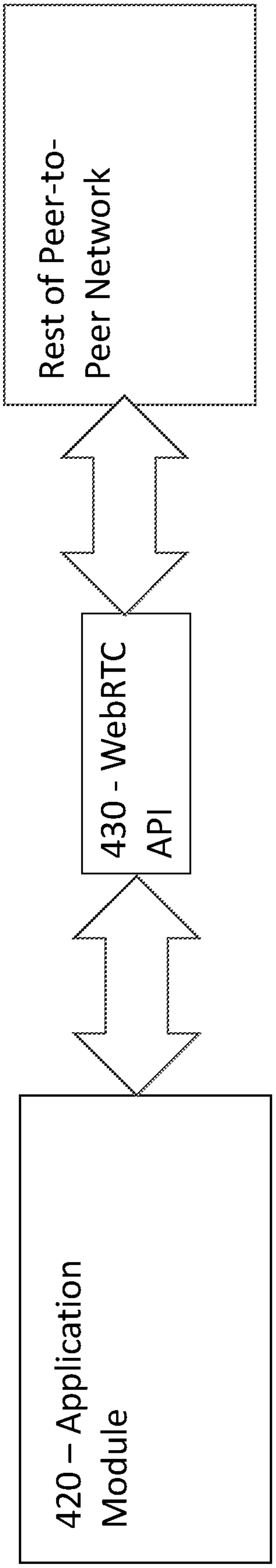
Figure 7:
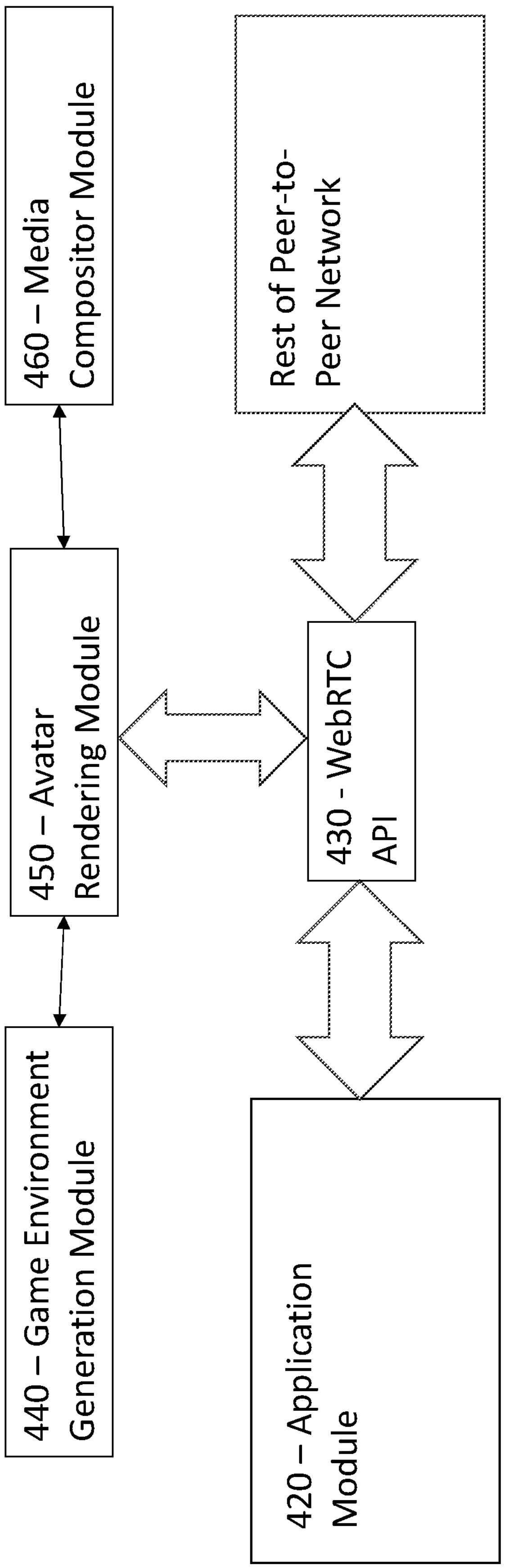
Figure 8:
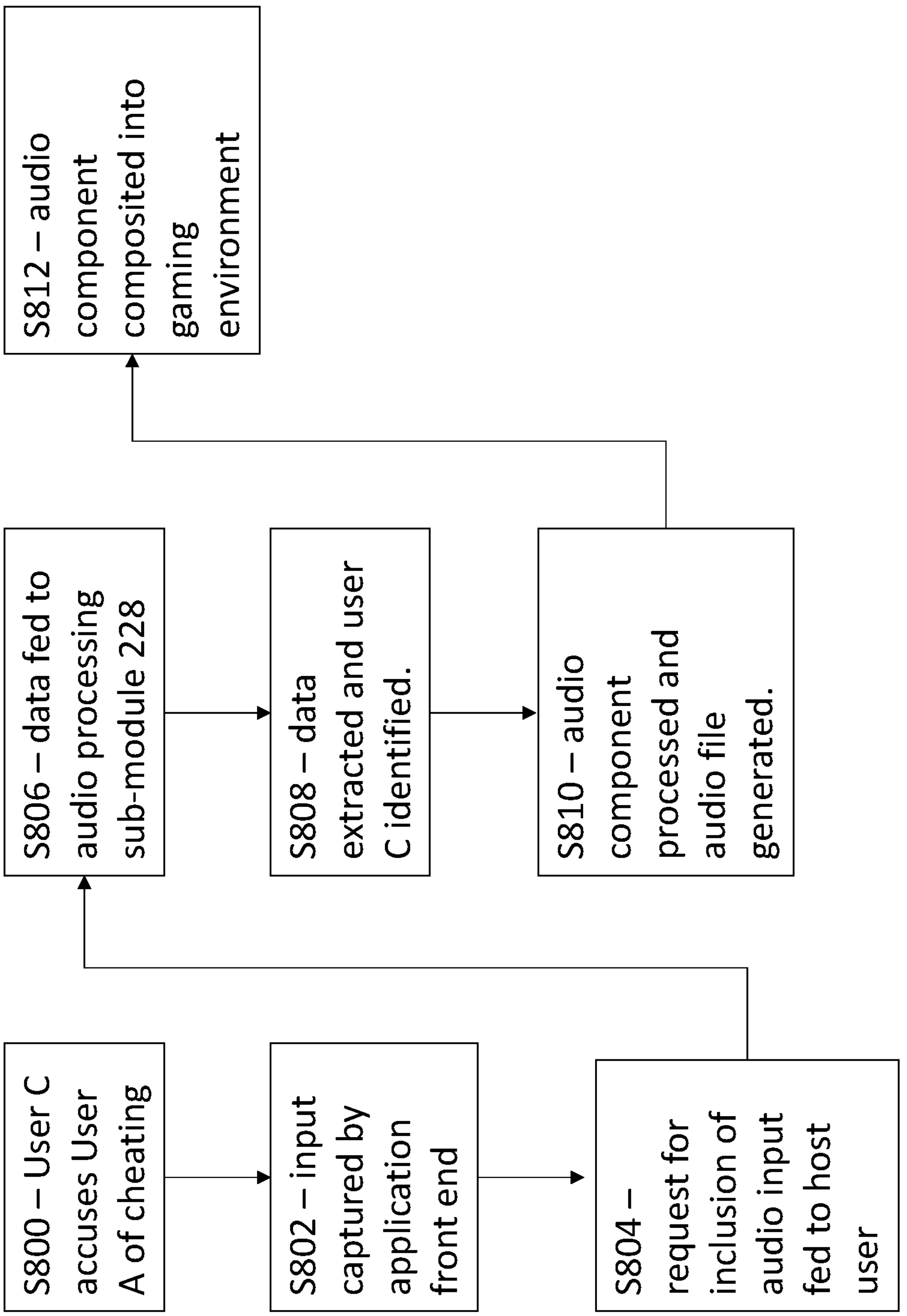
Figure 9:
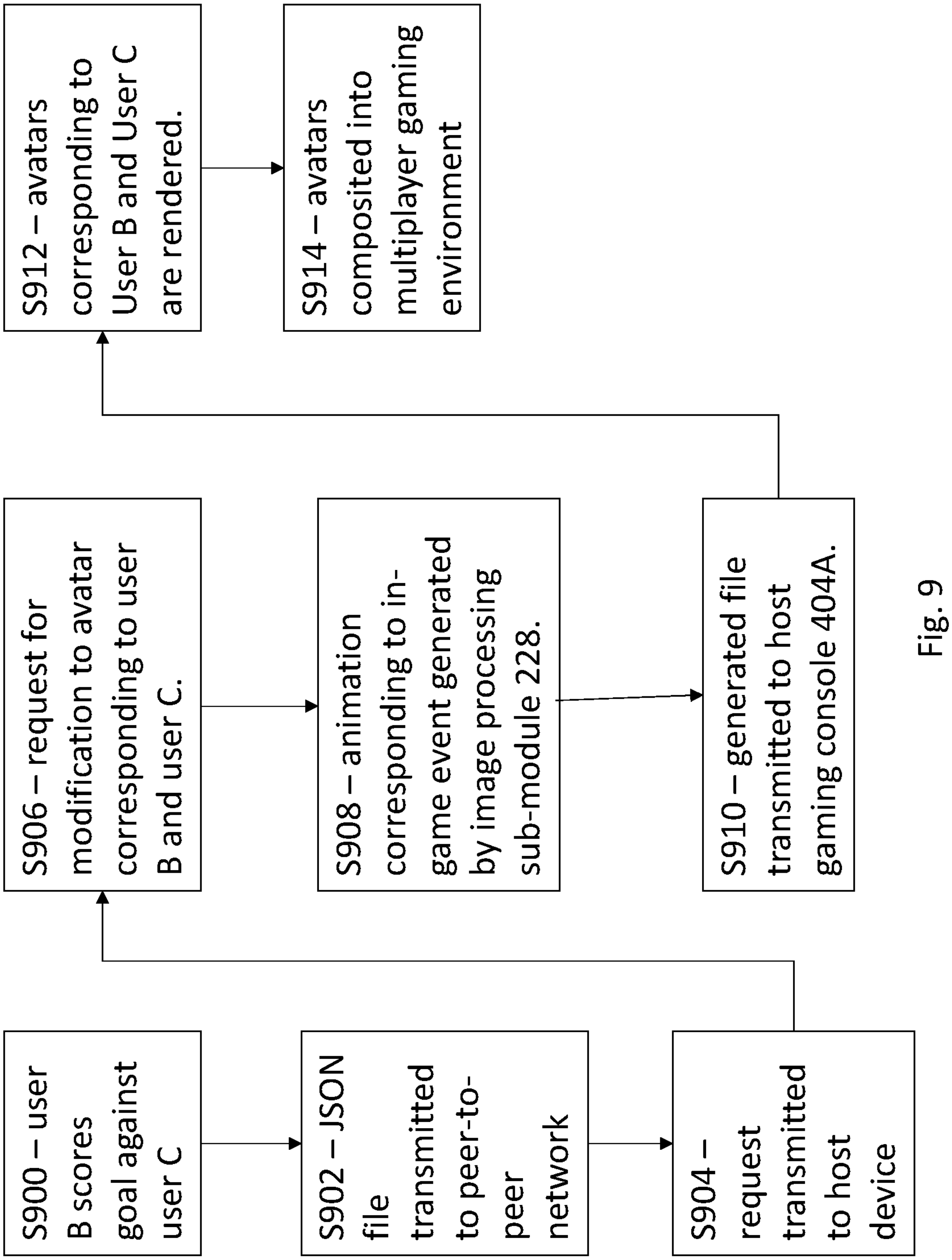

FIG. 3*a* illustrates a flow diagram of the steps involved in rendering an avatar representing a user in accordance with an embodiment;

FIG. 3*b* illustrates a flow diagram illustrating the steps involved in the composition of a change to an avatar representing a user in accordance with an embodiment;

FIG. 3*c* illustrates a flow diagram illustrating the steps involved in the composition of a change to an avatar based on in-game data received from a gaming environment in accordance with an embodiment;

FIG. 4 illustrates a multiplayer gaming architecture comprising a plurality of players each participating in gaming environment where user devices form a peer-to-peer network in accordance with an embodiment;

FIG. 5 illustrates the interaction between a mobile telephone and the peer-to-peer network in accordance with an embodiment;

FIG. 6 illustrates the interaction between a games console and the peer-to-peer network in accordance with an embodiment;

FIG. 7 illustrates the configuration of a host games console and its interaction with peer-to-peer network in accordance with an embodiment; and FIG. 8 illustrates a flow diagram illustrating the steps involved in the composition of the change to an avatar in accordance with an embodiment; and FIG. 9 illustrates a flow diagram illustrating the steps involved in the composition of the change to an avatar based on in-game events in accordance with an embodiment.

Figure 1:
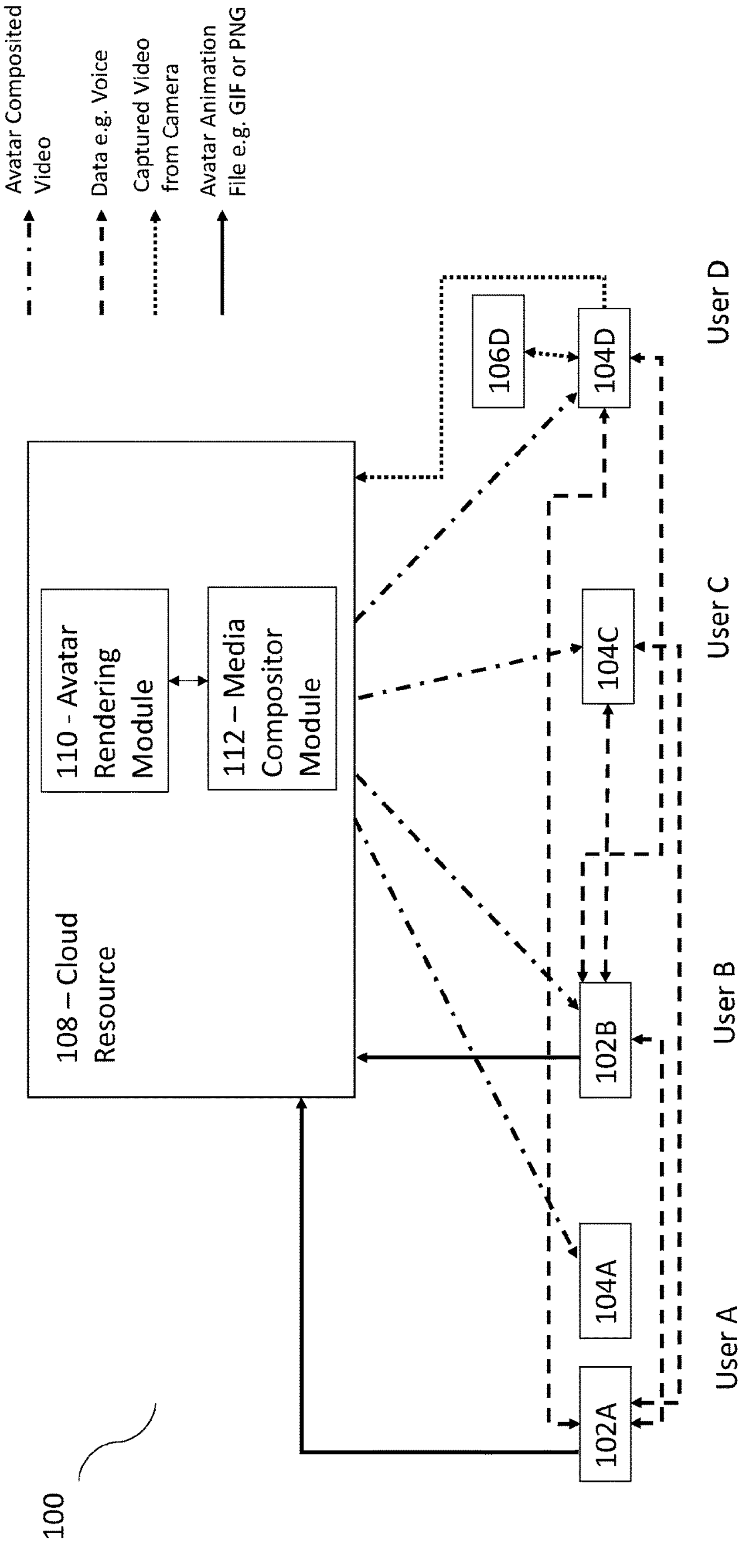
FIG. 1 illustrates a multi-player gaming architecture comprising a plurality of players each participating in a gaming environment where user devices interact with a cloud-based resource.

We now describe, with reference to FIG. 1, an architecture 100 which enables multiple players to participate in the same gaming environment.

User A has a mobile telephone 102A and a gaming console 104A. User B has a mobile telephone 102B. User C has a gaming console 104C. User D has a gaming console 104D and a camera 106D which is associated with the gaming console 104D. A suitable gaming console may be the Sony Playstation 5®. The Sony Playstation 5® has an associated high definition camera.

Each the of the mobile telephones are configured to interact with a cloud resource 108 which comprises an avatar rendering module 110 and a media compositor module 112. Each of the gaming consoles are also configured to interact with the cloud resource 108.

Each of the mobile telephones are configured to interact with each of the other mobile telephones by communication of data in accordance with any suitable data-transmission protocol, e.g. Bluetooth®, Near-field Communication, TCP-IP, UDP. This can be used to transmit voice or other types of data between the respective telephony devices.

The cloud resource 108 is configured to receive data from any of the mobile telephones or gaming consoles, as will be described in more detail below, although an arrow in this respect is omitted from FIG. 1 for the sake of simplicity. The media compositor module 112 is configured to receive the data when it is transmitted to the cloud resource 108 and to interact with avatar rendering module 110 based on the data received at the cloud resource 108. The cloud resource 108 is also configured to transmit data to any of the mobile telephones or gaming consoles.

The cloud resource 108 is also configured to implement a multiplayer gaming environment where each of User A, User B, User C and User D have an associated profile in that gaming environment which enables them to play an interactive video game as part of that multiplayer gaming environment. Gaming console 104A may stream the multiplayer gaming environment from the cloud resource 108. Mobile telephone 102B may stream the multiplayer gaming environment from the cloud resource 108 using a remote gameplay application such as, for example Sony Playstation® RemotePlay. Gaming consoles 104C and 104D may also stream the multiplayer gaming environment from the cloud resource 108. The cloud resource 108 has access to its own processing resources to implement the computing operations it needs to provide as part of implementing the multiplayer gaming environment which is streamed by gaming console 104A, mobile telephone 102B, gaming console 104C and gaming console 104D.

That is to say, the cloud resource 108 may be utilised for both avatar rendering and composition in addition to the generation of a multiplayer gaming environment, which is then streamed to respective devices. The cloud resource 108 may be configured to deploy separate cloud instances (or set of cloud instances) for each of avatar rendering and composition, and a further instance (or set of cloud instances) for generating and streaming the multiplayer gaming environment to the respective devices. For example, the rendering performed by avatar rendering module 110 may require a specific Graphical Processing Unit (GPU) instance. However, the available slices of GPU resources in cloud resources are typically limited in cloud instances and the number of requests to adjust or add a visual element, such as an avatar, would need to be optimised. Other types of cloud instances, i.e. those without GPU resources, may then be used to handle the compositing performed by media compositor module 112 and the communication with the other devices, which may include streaming of the data needed by the respective device to visualise the multiplayer gaming environment.

Figure 2:
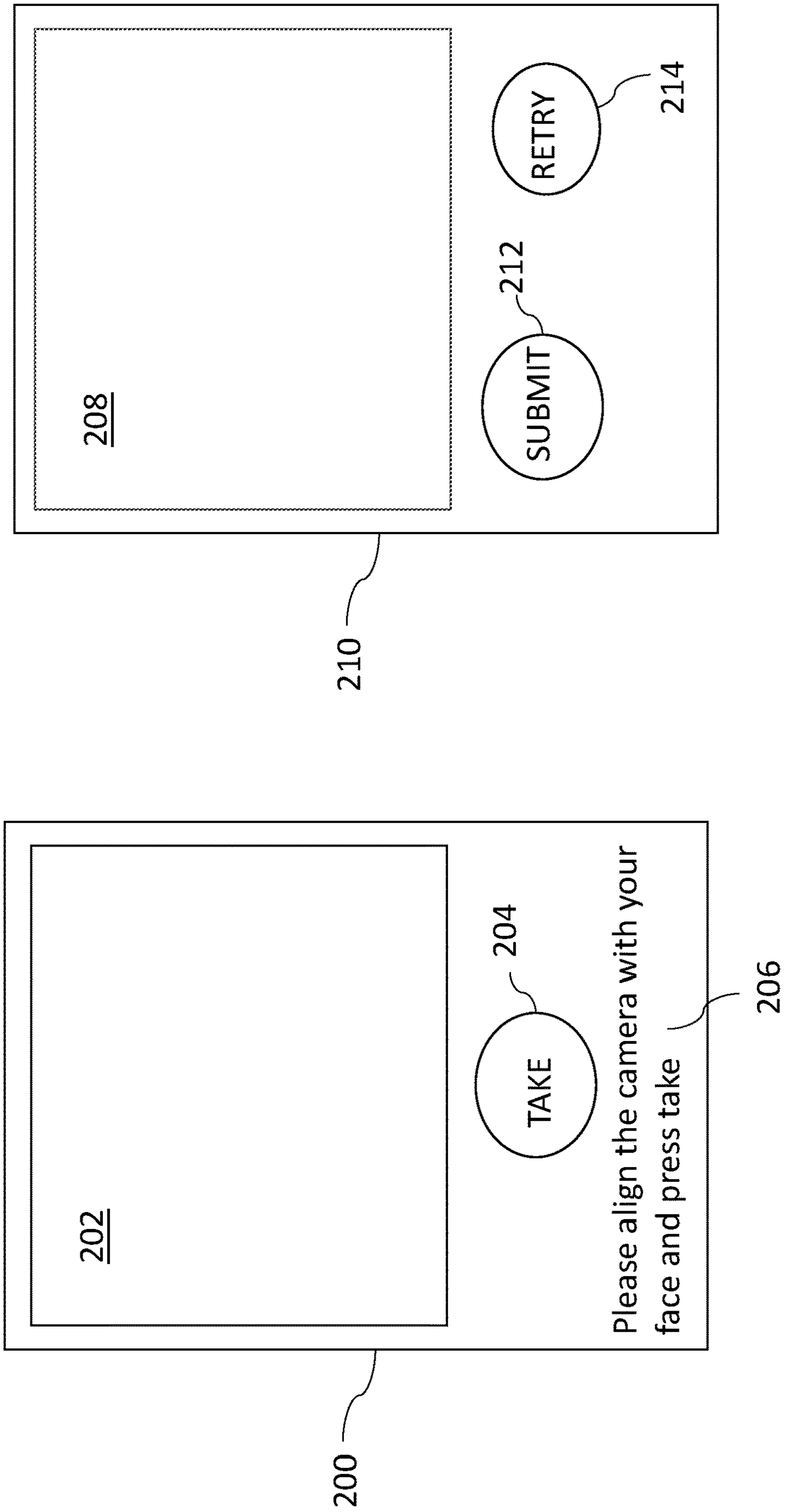
FIGS. 2 and 2A illustrate user interfaces which enable a user to generate an avatar representation of themselves on a mobile telephone.

We now describe, with reference to FIG. 2, a user interface which may be provided to a user on a device such as mobile telephone 102A as part of an application to enable interaction with the cloud resource 108 by the mobile telephone 102A. A user interface 200 is provided on a display of the mobile telephone 102A. The user interface 200 provides an image pane 202, a “TAKE” button 204 and an instruction box 206. The image pane 202 is provided through the camera on the mobile telephone 102A.

The user captures an image of their face in the image pane 202 and presses the button 204 to request processing of their image by the application. The application is configured to convert the image into an avatar of their human face through use of standard facial motion capture software. This is explained in further detail below.

That is to say, the application configures the mobile telephone 102A to generate avatars on the device prior to transmission to the media compositor module 112 where it is composited into the multiplayer gaming environment. The application software is described schematically now with reference to FIG. 2A and then in further detail with reference to FIGS. 3A, 3B and 3C. The application, when installed on the mobile telephone 102A, configures a processor on the mobile telephone 102A to run computer executable instructions to run application module 220.

Application module 220 further comprises an audio processing sub-module 228. The audio processing sub-module 228 is configured to receive audio input provided through the microphone on the mobile telephone 102A and generate further effects to be composited into the multiplayer gaming environment provided by cloud resource 108, as will be described below.

Image processing sub-module 224 is configured to convert the submitted image into an avatar representation of the image provided through the user interface 200. The image processing sub-module 224 is configured to generate an avatar representation from the submitted image. The image processing sub-module 224 can for example utilise software development kits (SDKs) from facial motion capture technology providers to generate the avatar representation of the submitted image and, from the avatar representation, generate a file in a suitable format which can be used by the media compositor module 112 to compose the avatar directly into the multiplayer gaming environment. Suitable file formats include Graphical Interchange Format (GIF) files and Portable Network Graphic (PNG) files. This will be described in further detail below. Alternatively, the image processing sub-module 224 may access corresponding application processing interfaces (APIs) to generate the avatar representations of the submitted image and, from the generated avatar representation, generate a file in a suitable format.

API 226 is configured to enable interaction between the application module 220 and the cloud resource 108 when the application module 220 processes inputs which are to be composited as changes to visual effects in the multiplayer gaming environment provided by cloud resource 108.

Application module 220 further comprises an audio processing sub-module 228. The audio processing sub-module 228 is configured to receive audio input provided through the microphone on the mobile telephone 102A and generate further effects to be composited into the multiplayer gaming environment provided by cloud resource 108, as will be described below.

Application module 220 further comprises an in-Game Element Processing Sub-Module 230 which is configured to receive a stream of data from the multiplayer gaming environment provided by cloud resource 108. The in-Game Element Processing Sub-Module 230 is configured to process the stream of data to generate further addition or amendment of visual effects in the multiplayer gaming environment, as will be described in more detail below.

The generated avatar is then provided back to User A on user interface 210 through image pane 208. Two buttons are provided and they are “SUBMIT” 212 and “RETRY” 214. If User A wishes to recapture the image to generate a different avatar then they can press button 214 to go back to user interface 200. If they are happy with the image and the avatar then they can submit the avatar for use in the multiplayer gaming environment generated by pressing button 212 as now set out with reference to FIG. 3A.

It should be emphasised that user interfaces 200 and 210 are provided for illustration only. Any suitable interface which enables facial motion capture is suitable.

In a step S300, User A presses button 212 to approve their avatar for use in the game playing environment provided by cloud resource 108. This causes the data corresponding to the avatar to be transmitted to the cloud resource 108 in a step S302. The application module 220 utilises application programming interface (API), following processing by the image processing sub-module 224, to submit the data to the cloud resource 108 in a file format which enables it to be composited directly into the multiplayer gaming environment. That is, in GIF or PNG format (or in any other suitable format). The image processing sub-module 224 also provides data which identifies the user to the cloud resource 108 so that the associated profile in the multiplayer gaming environment can be identified by the media compositor module 112. The data is received by the media compositor module 112 as a request for the addition of the avatar into the multiplayer gaming environment provided by cloud resource 108. This is step S304.

That is to say, the GIF file (or PNG file) is transmitted to the cloud resource and received by the media compositor module 112 in a form in which it can be composited directly into the multiplayer gaming environment. Therefore, the processing overhead of generating the avatar representation is incurred by the mobile telephone 102A and not the media compositor module 112 or any of the other modules which are used by the cloud resource 108 to implement the multi-player gaming environment. The processing overhead of generating the avatar is also not incurred by the gaming console 104A and so it can commit more resource to displaying the gaming environment during play by User A.

Steps S300 to S310 may be completed in real-time, i.e. as soon as the user approves the avatar in step S300, steps S302 to S310 to transmit the data to the cloud resource, the rendering of the avatar representation and the composition of the avatar representation into the gaming environment may be performed.

The media compositor module 112, on receiving the data from the mobile telephone 102A in step S304, extracts from the request the identity of User A and retrieves the profile data corresponding to User A. This step S306. The data may be received from a designated storage provision which may also be provided through the cloud. The designated storage provision stores the user details and the data which enables the avatar representation to be retrieved. The file corresponding to the avatar representation is then sent to the avatar rendering module 110 where the file is opened and the avatar representation corresponding to User A is rendered. This is step S308.

It is then transmitted back to the media compositor module 112 where it is composited into the multi-player gaming environment which is being streamed by the gaming console 104A, the mobile telephone 102B, the gaming console 104C and the gaming console 104D. This is step S310. Alternatively or additionally, if the mobile telephone 102A does not have the processing capacity to support the functionality provided (or the bandwidth and processing capacity needed) by the application module 220 then it may receive the user input through user interface 200 and the data may be transmitted to the other device 102B where the steps S300 and S302 may be performed before the data is received by media compositor module 112 in step S304. That is to say, if a first computing device does not have so-called "smart-phone" functionality then it may capture the image and transmit the data to a second computing device for avatar generation before transmission to the cloud resource 108 to take advantage of the functionality of the second device. Alternatively, the user interface 200 may be provided by the mobile telephone 102A and the captured data transmitted to the cloud resource where the functionality of application module 220 may be implemented before the avatar is approved in step S300 before proceeding to steps S302 to S310.

Steps S300 to S310 may be completed in real-time, i.e. as soon as the user approves the avatar in step S300, steps S302 to S310 to transmit the data to the cloud resource, the rendering of the avatar representation and the composition of the avatar representation into the gaming environment may be performed.

We now describe, with reference to FIG. 3B, how an avatar corresponding to user D can be changed as they respond to user A's new avatar being composited into the multiplayer gaming environment provided by cloud resource 108.

User D has a high definition camera 106D which captures their change in facial expression as they smile at approval at user A's new avatar. This is step S312. Mobile telephone 102A is designated as being the processing resource for the generation of any changes to the avatar associated with user D. Camera 106D transmits the captured image data to the gaming console 104D with a request for it to be added into the multiplayer gaming environment being streamed by gaming console 104D. This is step S314.

In step S316, gaming console 104D transmits a request to cloud resource 108 for a change to be made to the avatar corresponding to user D. As mobile telephone 102A is designated to be the device which generates the changes to the avatar corresponding to user D, the cloud resource 108 transmits the data corresponding to the change in user D's avatar to mobile telephone 102A, i.e. the designated device. This is step S318. Optionally, the designated device could be changed to mobile telephone 102B or any of the other mobile telephones.

Application module 122 receives the data via API 226 and it is transmitted to image processing sub-module 224. This is step S320. The image processing sub-module 224 is configured to overlay a mesh of data points onto the data to determine the change in facial expression in the image captured by the high definition camera 106D. This can be implemented using standard face detection and face mesh techniques. The image processing sub-module 224 may be configured to deploy these applications or use corresponding APIs to apply the techniques provided those applications to the data points. The facial landmarks which are identified by the data points can be used by a neural network built into the software to identify changes in facial expressions such as smiles, frowns, winks etc. This enables the image processing sub-module 224 to infer the 3D surface geometry of the face and build a facial mesh and pose transformation matrix corresponding to the facial landmarks.

The change in facial expression is used to identify a facial change such as a smile which is to be applied to the avatar corresponding to user D. This is step S322. Application module 122 may have been already provided with the GIF or PNG file corresponding to user D's avatar or it may issue a request to the cloud resource for the file. The corresponding GIF or PNG could be stored in any suitable storage.

That is to say, if the camera 106D detects a smile it can be mapped by the image processing sub-module 224 to a change in facial landmarks which is used by a neural network to infer that the captured image corresponds to a smile. The same approach can be used to detect other facial expressions such as a wink, a smirk, anger etc. This can be implemented using an API corresponding to software configured to map the change in facial landmarks to various facial expressions.

A list of common facial changes may be accessed by the image processing sub-module 224. They may include winks, smiles, grins, gurns and looks expressing various emotions such as happiness, sadness, fear, disgust, surprise and dismay. In this example, user D has smiled and this is identified by the image processing sub-module 224 in step S322. The list of common facial changes may be updated from time to time as part of the update of the application implemented by application module 220.

The smile is then mapped onto user D's avatar and saved as a modified GIF or PNG which is then transmitted back to the cloud resource 108 via API 226. This is step S324. The smile may be generated to be an animation which means the file will need to comprise a series of frames. When the modified file is transmitted back to the cloud resource 108, user D is identified in the request. This means that the cloud resource 108 can identify the user corresponding to the modified avatar.

On receiving the modified file from the mobile telephone 102A, the media compositor module 112 transmits the data to the avatar rendering module 110 which extracts the data corresponding to the modified avatar, renders the modified avatar to show it smiling and then transmits it back to the media compositor module 112 for composition into the multiplayer gaming environment. This is step S326.

The media compositor module 112 then composites the modified avatar into the multiplayer gaming environment provided by cloud resource 108 and streamed by gaming console 104A, mobile telephone 102B, gaming console 104C and gaming console 104D. This is step S328. This means that User A, User B, User C and User D will each see a change in the avatar corresponding to User D showing a smile representative of User D's happy reaction to User A's avatar being composited into the environment in steps S300 to S310. This is because the captured image, i.e. from camera 106D, has been mapped to a smile by the mesh of data points overlaid onto the captured image and processed by the image processing sub-module 224. That is to say, the smiling avatar which is composited into the gaming environment is generated by User D smiling in view of camera 106D. In short, multimedia input leads to a request for a change in the avatar to be generated. That change is processed at mobile telephone 102A and does not swallow up the processing resources on the cloud resource 108.

Again, the processing overhead corresponding to the change in the avatar corresponding to User D is incurred by mobile telephone 102A and not the cloud resource 108 which provides the multiplayer gaming environment or any of the gaming consoles or other devices streaming the multiplayer gaming environment.

As with steps S300 to S328, steps S312 to S328 may be performed in real time responsive to the capture of the facial expression of user D.

In the event user A is not playing, the designated device may be adjusted to another device where the processing overhead may be concentrated during the playing of the game by User B, User C and User D. User A may also request that the designated device is changed to another device using input through the mobile telephone 102A.

Multimedia input, that is through cameras and microphones and other sources of input, is not the only means by which the avatar and overall multiplayer gaming environment may be changed. Similarly, other changes may be made based on in-game events.

As with steps S300 to S328, steps S312 to S328 may be performed in real time responsive to the capture of the facial expression of user D.

We now describe, with reference to FIG. 3C, how an in-game event may generate changes in the avatar. In-game events may include a user achieving a specific goal, completing a level, dying (in the game) and all of these events generate data.

In a step S330, User C wins a battle with User D which causes the demise of User D in the game. This generates metadata which is added to a JavaScript Object Notation (JSON) file by the cloud resource 108. The cloud resource 108 may access the JSON file in its local storage or in cloud storage but any storage resource which can store a JSON file is suitable. The metadata is structured as a data structure which comprises a field which contains an identifier for the event and the users involved in the event. That is to say, the metadata indicates that there has been a demise of a user, that user is User D and the demise has been caused by User C. The frequency at which metadata is added to the JSON file by the cloud resource 108 can depend on the game. Some games may be described as more action-packed than others. A multi-player football game, for instance, may have a relatively high number of events as goals are scored, players are sent off etc. Each of these events may be added to the JSON file by the cloud resource 108. A multi-player golf-game, by comparison, may have a lower number of events as events may only be added when respective courses are finished or when players hit a hole in one or other rare events on a golf course.

In step S332, the JSON file is transmitted to mobile telephone 102A where it can be processed by the application module 220. It is received by the application module 220 by interaction between the application module 220 and the API 226. The JSON file is passed to the in Game Element Processing Sub-Module 230. This is step S334. The in-Game Element Processing Sub-Module 230 is configured to extract the metadata from the JSON file in a step S336. The in Game Element Processing Sub-Module 230 is configured to determine from the extracted metadata an in-game event where User C has caused the demise of User D. The in-Game Element Processing Sub-Module 230 is configured to issue a request to the image processing sub-module 224 to generate changes to the avatar's corresponding to User C and User D. This is step S338. As part of the request, the in-Game Element Processing Sub-Module 230 sends identifiers indicating the changes to be made to respective User C and User D.

On receiving the request in step S338, the image processing sub-module 224 extracts the metadata and accesses a routine to processes the metadata to identifies from the metadata the entries in the metadata corresponding to the data associated with the visual changes which must be made to the avatars corresponding to User C and User D. This is step S340. That is to say, as User C has caused the demise of User D, image processing sub-module 224 may generate a GIF or PNG file which shows the respective avatar (corresponding to User C) jumping up and down with delight at causing the demise of User D. Image processing sub-module 224 also generates a GIF or PNG showing the avatar corresponding to User D falling to the floor or even exploding. The GIF or PNG may be generated a series of frames if it is an animation. The respective files depicting the changes to the respective avatars are then sent to the cloud resource via interaction through API 226. This is step S342.

As with FIGS. 3A and 3B, steps 330 to S344 can be carried out in real-time responsive to the in-game event which leads to the changes in the avatars corresponding to User C and User D.

That is to say, the processing of the changes to the avatars is performed on the mobile telephone 102A and not in the cloud resource 108 or any of the respective games consoles. This means that the processing resources on the cloud resource 108 and the respective games consoles is not absorbed by the processing requirement of changes to the avatars in response to in-game events.

The modified avatars can then be composited into the multiplayer gaming environment by the media compositor module 112 after rendering by avatar rendering module 110. This is step S344.

Indeed, the metadata which is added to the JSON file by the cloud resource 108 may be context driven or it may be game specific. For example, in a multiplayer game, the appearance of a main character may generate its own event to be added to the JSON file (by the cloud resource 108) due to the significance of that main character in the game. The in-Game Element Processing Sub-Module 230 may be configured to generate an addition or an amendment of a visual event during the play of this game. The addition may be another avatar corresponding to the main character. An amendment may be that the avatars corresponding to User A, User B, User C and User D may show an expression of concern or exasperation. These additions and changes can be processed in a manner similar to that described with reference to steps S330 to S344. A context driven example may be one of the users pressing pause to temporarily stop the game. This may lead to a change in each of the avatars which shows them, for example, sitting and appearing to be bored waiting for that user to return. Such an in-game event may also be processed using an approach similar to that set out with reference to steps S330 to S344.

As with FIGS. 3A and 3B, steps 330 to S344 can be carried out in real-time responsive to the in-game event which leads to the changes in the avatars corresponding to User C and User D.

We now describe, with reference to FIG. 4, a second architecture 400.

The second architecture 400 comprises first mobile telephone 402A and first games console 404A. First mobile telephone 402A and first games console 404A are operated by User A. The second architecture 200 further comprises second mobile telephone 402B and second games console 404B which are each operated by User B. The second architecture 400 comprises third mobile telephone 402C which is operated by User C. The second architecture 400 further comprises third gaming console 404D which is operated by User D. The second architecture 400 further comprises fourth gaming console 404E which is operated by User E. Gaming console 404E has an associated high definition camera 406E. An example of camera 406E may be the Sony Playstation Camera and an example of the gaming consoles may be the Sony Playstation 5®.

The second architecture 400 comprises a designated host user which in this example is User A. Absent User A or on request, the host user may be changed based on network parameters such as the available bandwidth. That is to say, if User A is determined to have insufficient bandwidth or to have simply logged out of the gaming environment provided by architecture 200, the host user can be reselected based on a suitable network parameter such as available bandwidth or available device storage.

Figure 2A:
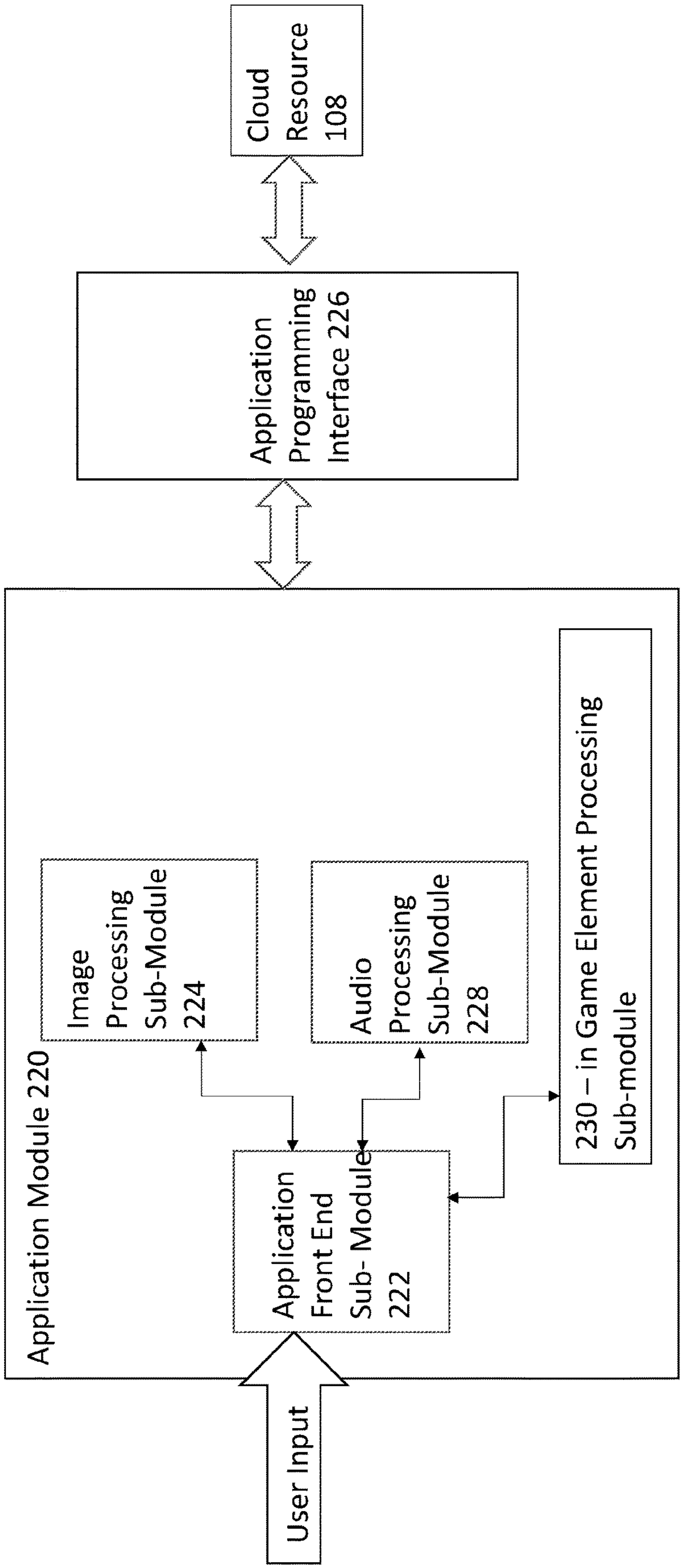

Each of the mobile telephones has installed upon it, an application which comprises application module 220 as described with reference to FIG. 2A. That is to say, each of the mobile devices can provide user interface 200 as set out above to enable users to submit their own images to be converted into avatars. Additionally, each of the mobile telephones and games consoles is configured to implement a peer-to-peer network between all of the mobile telephones and games consoles which form the architecture 200. Each device and console may be configured to implement the peer-to-peer network using a Web Real Time Communication (RTC) API 410 as illustrated in FIG. 5 below. The games consoles are configured with their own application 420 which enables them to feed in-game events into the Peer-to-Peer Network as a JSON file. This is illustrated in FIG. 6. That is to say, the games consoles in architecture 400 are configured for their own interaction with the peer-to-peer network implemented by architecture 400. Each games console comprises application module 420 which receives an input stream of in-game events from the gaming environment which is streamed by the respective games console. The application module 420 is configured to interact with the rest of the peer-to-peer network using WebRTC API 430.

The host devices for the peer-to-peer network are the devices used by User A, i.e. the mobile telephone 402A and the games console 404A. The other games consoles, i.e. consoles 404B, 404D and 404E, and the mobile telephone 402C (through a remote game playing application such as Sony RemotePlay) are configured to stream a multiplayer gaming environment from games console 404A. The games console 404A has installed upon it a game environment generation module 440, an avatar rendering module 450 and a media compositor module 460 as illustrated in FIG. 7. Each of the game environment generation module 440, the avatar rendering module 450 and the media compositor module 460 are configured to interact with the rest of the peer-to-peer network using Web RTC API 430. Each of the game environment generation module 440, the avatar rendering module 450 and the media compositor module 460 are configured for interaction between each other using any suitable data communications means.

The game environment generation module 440 is configured to provide the multiplayer gaming environment which is streamed by each of consoles 404B, 404D and 404E and mobile telephone 402C. The avatar rendering module 450 is configured to render the avatar corresponding to users associated with a profile inside the multiplayer gaming environment. The media compositor module 460 is configured to composite the visual effects into the gaming environment provided by game environment generation module 440.

This architecture will now be described, with reference to FIG. 8, by way of non-limiting example below where input is received through a microphone on mobile telephone 402C.

Steps S800 to S812 may be carried out in real-time, i.e. responsive to the utterance by User C that User A is cheating, steps S802 to S812 are carried out so that the audio component corresponding to the utterance is composited into the gaming environment as it happens.

In a step S800, User C says that User A is cheating at the game provided within the gaming environment which is streamed by mobile telephone 402C. This is captured by the microphone on the mobile telephone 402C and is fed to the application module 220 as user input which is transmitted to application front end sub-module 222. This is step S802.

The audio input captured by the microphone is then fed to the Web RTC API 430 by the application module 420 with a request for the audio input to be composited into the gaming environment. As User A is the host user, the request is transmitted to mobile telephone 402A using the peer-to-peer network implemented by architecture 400. This is step S804. The request identifies User C and contains data which corresponds to the audio input captured by the microphone.

The mobile telephone 402A receives the request via Web RTC API 430 and it is fed to the audio processing sub-module 228. This is step S806. The audio processing sub-module 228 is configured to extract from the request the identity of User C and the data corresponding to the audio input, i.e. the phrase "CHEAT". This is step S808. The audio processing sub-module 228 extracts the audio component using standard signal processing techniques in a step S810 to generate an audio file to be composited into the gaming environment. The audio file is then transmitted to the host games console 404A where it is composited into the gaming environment by media compositor module 460. This is step S812. The audio processing sub-module may also issue a request to the image processing sub-module 224 for the avatar corresponding to User C to be modified so that it produces a speech bubble saying "CHEAT" as an animation of the avatar. This is transmitted to the avatar rendering module 450 where the avatar is rendered as an animation by the avatar rendering module 450 and composited into the gaming environment synchronously with the composition of the audio file into the gaming environment.

That is to say, the host mobile telephone 402A incurs the processing overhead associated with processing the input through the microphone on mobile telephone 402C and the host games console 404A composites the audio input into the gaming environment, where it can be streamed by the other games consoles on the peer-to-peer network provided by architecture 400.

Steps S800 to S812 may be carried out in real-time, i.e. responsive to the utterance by User C that User A is cheating, steps S802 to S812 are carried out so that the audio component corresponding to the utterance is composited into the gaming environment as it happens.

We now describe, with reference to FIG. 9, how the architecture 400 can generate a change in the gaming environment responsive to an in-game event.

In a step S900, User B scores a goal against User C in a multiplayer football game. This event is appended to a JSON file by application module 420 installed on games console 404A. Application module 420 is configured to generate JSON files based on in game events in the gaming environment which is generated by game environment generation module 440. In game events are appended as metadata to the JSON file. The in-game event is identified by its own identifier and the users involved are also identified. Alternatively or additionally, the JSON file may already exist and may be accessed by the application module 420 when an event is generated in the gaming environment.

The JSON file is transmitted via the WebRTC API 430 to the peer-to-peer network with a request for the in-game event, i.e. the goal scored by user B against user C, to generate a change in the avatars corresponding to User B and User C. This is step S902. As mobile telephone 402A is part of the host devices, the request is transmitted to mobile telephone 402A where it is received via interaction with WebRTC API 410. This is step S904.

The in-Game Element Processing Sub-Module 230 uses a routine to process the metadata and extract from the request the fields in the metadata corresponding to the in-game event and users B and C. The in-Game Element Processing Sub-Module 230 then provides a request to Image Processing Sub-Module 224 for the avatars corresponding to Users B and C to be modified using the in-Game event identifier corresponding to a goal. This is step S906. Such an identifier may be specific to a particular title. Such an identifier may also specify that the avatar corresponding to User B be animated to celebrate in a specific way. This may be in accordance with an agreement between the game title developer and a football star, for instance, who may, as part of an image rights agreement, provide consent for his particular celebration to be used as part of an avatar animation during play of the game.

Steps S900 to S914 may be carried out in real-time, i.e. the occurrence of the in-game event leads automatically (as it happens) to the steps S902 to S914 being carried out.

The image processing sub-module 224 generates a suitable animation of the avatars corresponding to the in-game event. This is step S908. The animation is saved as a GIF file and is then transmitted to the gaming console 404A, as it is the host gaming console. The transmission is achieved using the peer-to-peer network via WebRTC API 410. This is step S910. The avatars corresponding to User B and User C are rendered in accordance with the received GIF file by the avatar rendering module 450. This is step S912.

The rendered avatars are then composited into the multiplayer gaming environment by the media compositor module 460 so that they form part of the multiplayer gaming environment generated by game environment generation module 440. This is step S914. The rendered avatar will represent celebration by User B and commiseration by User C. They will be seen by all of the users as they are streaming the gaming environment from gaming console 404A using the peer-to-peer network.

That is to say, the processing overhead associated with generating and compositing the animated avatars is incurred by the host devices and not the other devices, which simply stream the animation as a visual effect inside the multiplayer gaming environment.

If the host devices are changed, then game environment generation module 440, avatar rendering module 450 and media compositor module 460 can be downloaded by the new host game console from the gaming console 404A.

Steps S900 to S914 may be carried out in real-time, i.e. the occurrence of the in-game event leads automatically (as it happens) to the steps S902 to S914 being carried out.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:

executing, by a first electronic device, a computer-implemented entertainment environment;

transmitting, by the first electronic device to a second electronic device, a request to manage an appearance of the computer-implemented entertainment environment;

in response to the request, receiving, by the first electronic device from the second electronic device, a rendered avatar; and incorporating, by the first electronic device, the rendered avatar into the computer-implemented entertainment environment as the computer-implemented entertainment environment is being executed by the first electronic device.

2. The computer-implemented method according to claim 1, wherein the first electronic device is operative to provide a first processing capacity and the second electronic device is operative to provide a second processing capacity.

3. The computer-implemented method according to claim 1, wherein the second electronic device is distinct from the first electronic device.

4. The computer-implemented method according to claim 1, wherein the first electronic device corresponds to a first user specific to the first electronic device and the second electronic device corresponds to a second user specific to the second electronic device.

5. The computer-implemented method according to claim 4, wherein the rendered avatar corresponds to a graphical representation of the first user.

6. The computer-implemented method according to claim 5, wherein the request includes a request to change a visual characteristic of the graphical representation.

7. The computer-implemented method according to claim 4, wherein the rendered avatar is based on an image associated with the first user and/or the first electronic device.

8. The computer-implemented method according to claim 7, further comprising, prior to transmitting the request:
- converting, by the first electronic device, the image into an avatar representation of the user; and
- assigning, by the first electronic device, the avatar as a graphical representation of the first user to be used in the computer-implemented entertainment environment, wherein:
  - the request includes a request to change an appearance of the avatar; and
  - the rendered avatar includes a changed appearance from the avatar.

9. The computer-implemented method according to claim 7, further comprising:
- retrieving, by the first electronic device, an avatar representation of the first user from an image store; and
- assigning the avatar representation as a graphical representation of the first user to be used in the computer-implemented entertainment environment.

10. The computer-implemented method according to claim 4, wherein the request includes metadata associated with an event in a computer-implemented interactive entertainment environment.

11. The computer-implemented method according to claim 10, further comprising generating, based at least in part on the metadata, an addition or alteration of an avatar associated with the first user into the computer-implemented entertainment environment.

12. The computer-implemented method according to claim 11, wherein:
- the addition or alteration of the avatar corresponds to a change in a status of the first user; and
- the status is associated with the computer-implemented entertainment environment.

13. The computer-implemented method according to claim 1, wherein the request comprises an audio-component.

14. The computer-implemented method according to claim 13, further comprising formatting an audio component for compositing into the computer-implemented entertainment environment synchronously with the rendered avatar.

15. The computer-implemented method according to claim 1, wherein the second electronic device is a cloud resource or a mobile computing device.

16. The computer-implemented method according to claim 1, wherein the request includes image data from a camera.

17. The computer-implemented method according to claim 1, wherein the request includes data relating to a use of one of the first electronic device or second electronic device.

18. The computer-implemented method according to claim 1,
- wherein the first electronic device and the second electronic device is communicatively coupled to each other via a communication network.

19. The computer-implemented method of claim 1, wherein executing, by the first electronic device, the computer-implemented entertainment environment is free of rendering a rendered computer-generated visual element.

20. One or more non-transitory computer-readable media comprising computer-executable instructions that, when executed by one or more processors of a first electronic device, cause first the electronic device to perform operations comprising:
- executing, by the first electronic device, a computer-implemented entertainment environment;
- transmitting, by the first electronic device to a second electronic device, a request to manage an appearance of the computer-implemented entertainment environment;
- in response to the request, receiving, by the first electronic device from the second electronic device, a rendered avatar; and
- incorporating, by the first electronic device, the rendered avatar into the computer-implemented entertainment environment as the computer-implemented entertainment environment is being executed by the first electronic device.

21. A first electronic device comprising:
- a memory comprising computer-executable instructions; and
- a processor configured to access the memory and execute the computer-executable instructions to perform operations comprising:
  - executing, by the first electronic device, a computer-implemented entertainment environment;
  - transmitting, by the first electronic device to a second electronic device, a request to manage an appearance of the computer-implemented entertainment environment;
  - in response to the request, receiving, by the first electronic device from the second electronic device, a rendered avatar; and
  - incorporating, by the first electronic device, the rendered avatar into the computer-implemented entertainment environment as the computer-implemented entertainment environment is being executed by the first electronic device.

* * * * *